United States Patent
Johnson et al.

(10) Patent No.: US 6,332,072 B1
(45) Date of Patent: Dec. 18, 2001

(54) METHOD AND APPARATUS FOR DETECTING FAILURES IN A COMMUNICATION DEVICE BV SIGNAL METRICS

(75) Inventors: Christopher L. Johnson, Chicago; Daniel S. Flondro, Algonquin; Timothy J. Schmeltz, Palatine, all of IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/317,512

(22) Filed: May 24, 1999

(51) Int. Cl.⁷ ............... H04B 1/06; H04B 7/00; H04Q 3/26; H04L 1/00; H04L 12/26
(52) U.S. Cl. ............. 455/277.1; 342/368; 370/252; 375/372
(58) Field of Search .............. 455/226.2, 277.1; 342/368; 375/777, 341; 370/252, 479

(56) References Cited

U.S. PATENT DOCUMENTS

| | | | |
|---|---|---|---|
| 5,604,730 | * 2/1997 | Tiedemann et al. | 370/252 |
| 5,719,871 | * 2/1998 | Helm et al. | 370/479 |
| 5,878,098 | * 3/1999 | Wang et al. | 375/377 |
| 5,940,454 | 8/1999 | McNicol et al. | |
| 5,949,796 | 9/1999 | Kumar . | |
| 6,085,076 | * 7/2000 | Lindsay et al. | 455/277.1 |
| 6,100,843 | * 8/2000 | Proctor, Jr. et al. | 342/368 |
| 6,219,387 | * 4/2001 | Glover | 375/341 |

OTHER PUBLICATIONS

Dixon, "Spread Spectrum Systems", pp. 1–45, 1984.*

* cited by examiner

*Primary Examiner*—William Cumming
(74) *Attorney, Agent, or Firm*—Steven A. May (57) ABSTRACT

A communication device (101) includes multiple antennas (201–203), multiple receivers (222–224), and a processor (225). The communication device receives a first radio frequency (RF) signal via a first antenna (201) of the multiple antennas and a second RF signal via a second antenna (202) of the multiple antennas. The communication device determines a signal metric for the first RF signal and a signal metric for the second RF signal, compares the determined signal metrics to produce a signal metric comparison, and generates an error signal based on the signal metric comparison. The error signal may be remotely monitored for prompt corrective action.

13 Claims, 4 Drawing Sheets

METHOD AND APPARATUS FOR DETECTING FAILURES IN A COMMUNICATION DEVICE BY SIGNAL METRICS

BRIEF SUMMARY OF THE INVENTION

Thus there is a need for a method and an apparatus that provides improved detection of failures in the inbound portion of a wireless communication infrastructure prior to the advent of customer complaints and that does not require an investment in additional infrastructure equipment. Briefly, in accordance with one embodiment of the invention, a communication device is provided that includes a receiver section having a processor and an antenna system having multiple antennas. The communication device receives a first radio frequency (RF) signal via a first antenna of the multiple antennas and a second RF signal via a second antenna of the multiple antennas. The processor determines a signal metric of the first RF signal to produce a first signal metric determination, determines a signal metric of the second RF signal to produce a second signal metric determination, compares the first signal metric determination and the second signal metric determination to produce a signal metric comparison, and generates an error signal based on the signal metric comparison. By detecting differences in signals received via different antennas, undesirable conditions in a signal path can be detected and the signal path can be identified, facilitating remote detection of, and prompt response to, the undesirable conditions.

FIELD OF THE INVENTION

This invention is generally related to wireless communication devices, and in particular to the detection of device failures.

BACKGROUND OF THE INVENTION

Companies in the wireless communications infrastructure market compete on, among other things, system availability. System availability includes not only minimal downtime but also the ability to detect and resolve system problems before such problems become apparent to the users of the system. To facilitate the early detection of system problems, the infrastructure systems typically include alarm systems that will detect a failure in the infrastructure system and generate an alarm signal indicating such failure. The infrastructure system may then be remotely monitored for the presence of such alarm signals. Since the infrastructure typically comprises multiple geographically-diverse base sites, the ability to remotely monitor system failures is a highly desirable feature of an infrastructure system.

A wireless communications infrastructure typically includes at least one base site. A base site generally includes an inbound radio frequency (RF) portion that typically includes multiple antennas, an RF distribution system, and at least one base station. Each antenna is connected via a cable to the RF distribution system, and the RF distribution system is in turn connected via cables to the base station. The RF distribution system typically comprises multiple bandpass filters, each connected by cable to a signal splitter. In a typical wireless communication system, a low power RF signal transmitted by a mobile or portable communication unit is received by the multiple antennas. Each antenna conveys the received RF signal to a bandpass filter, which filters the desired signal from undesired signals. The filter then conveys the filtered signals to a signal splitter, which splits the received signal into multiple equal amplitude signals. Each of the equal amplitude signals is then conveyed to a base station. Each base station includes one or more receivers that can receive the RF signal from the splitter, demodulate the RF signal, and route the RF signal to a transmitter for rebroadcast or to a telephone interconnect device or other wireline destination.

Failures in the inbound portion of a base site are remotely detected by use of alarm systems that monitor the bias of active RF devices. Generally, an alarm signal is generated when the bias of an active device shifts outside of an acceptable range. However, the alarm systems provide very limited coverage of the variety of potential failures in the inbound portion and often will not detect many configuration or installation errors, open circuits or short circuits in the RF lineup, or cable failures or improper connections. For example, the alarm system will not distinguish between a base station that is inactive due to the absence of a received signal in the inbound portion and a base station that is inactive due to an improperly connected cable in the inbound portion that prevents a received RF signal from being conveyed to the base station.

One method of determining such a system failure is to wait for a customer complaint with respect to system performance and then to bring test equipment to the base site to manually check the inbound portion of the site. However, this angers customers and is time consuming and labor intensive. Another method of determining such a failure is to set up a separate test site containing a calibrated transmitter, which transmitter would transmit a calibrated test signal. The received test signal could then be analyzed at the base site. However, this requires an additional investment in infrastructure equipment.

Therefore a need exists for a method and apparatus that will provide improved detection of failures in the inbound portion of a wireless communication infrastructure prior to the advent of customer complaints and that does not require an investment in additional infrastructure equipment.

DESCRIPTION OF A PREFERRED EMBODIMENT

The present invention provides a method and apparatus that will provide improved detection of failures in the inbound portion of a wireless communication infrastructure prior to the advent of customer complaints and that does not require an investment in additional infrastructure equipment. The present invention provides a method and apparatus for detecting failures in a communication device that includes multiple antennas, multiple receivers, and a processor. The communication device receives a first radio frequency (RF) signal via a first antenna and a second RF signal via a second antenna. The communication device determines a signal metric for the first RF signal and a signal metric for the second RF signal, and compares the signal metrics to produce a signal metric comparison. The communication device generates an error signal based on the signal metric comparison. The error signal may be remotely monitored for prompt corrective action.

Generally, the present invention encompasses a communication device comprising a receiver section that includes at least one RF input port, at least one receiver, and a processor for determining a signal metric of an RF signal available on the RF input port, and an antenna system, coupled to the RF input port for coupling thereto the received RF signal, that includes multiple antennas including a first antenna for coupling a first RF signal to the input port and a second antenna for coupling a second RF signal to the input port. The processor determines a signal metric for the first RF signal to produce a first signal metric determination and determines a signal metric for the second RF signal to produce a second signal metric determination. The processor compares the first signal metric determination and the second signal metric determination to produce a signal metric comparison and generates an error signal based on the signal metric comparison.

Another embodiment of the present invention encompasses a method for detecting failures in a communication device including multiple antennas, at least one receiver, and a processor. The method comprises receiving a first radio frequency (RF) signal via a first antenna of the multiple antennas, determining a signal metric for the first RF signal, receiving a second RF signal via a second antenna of the plurality of antennas, and determining a signal metric for the second RF signal. The method comprises comparing the signal metric for the first RF signal to the signal metric for the second RF signal to produce a signal metric comparison, and generating an error signal based on the signal metric comparison.

Figure 1:
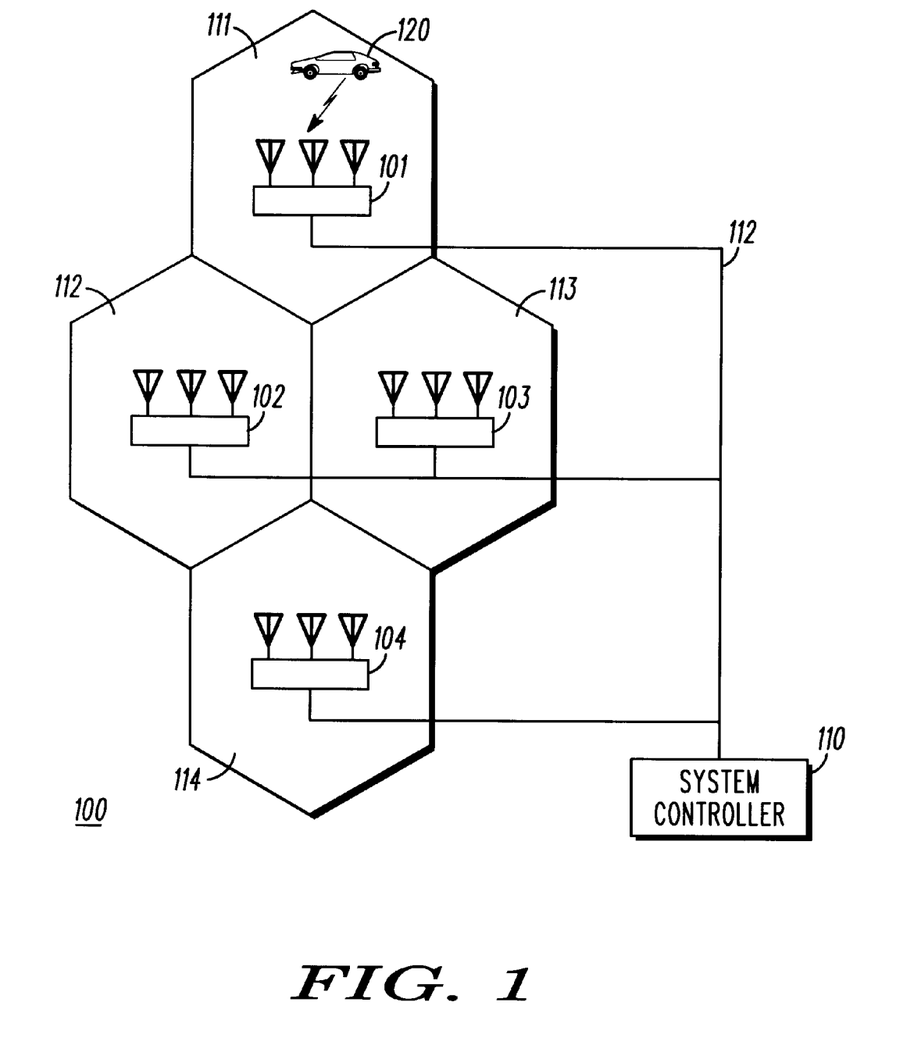
FIG. 1 is a block diagram of a radio communication system in accordance with a preferred embodiment of the present invention.

Turning now to the drawings, wherein like numerals designate like components, FIG. 1 illustrates a communication system 100 in accordance with a preferred embodiment of the present invention. The radio communication system 100 preferably comprises geographically diverse communication devices 101–104 (four shown), preferably base sites, that are coupled to each other and to a system controller 110 via a network 112, such as dedicated T1 phone lines or microwave links. The system also comprises a plurality of communication units 120, only one of which is shown in FIG. 1.

Figure 2:
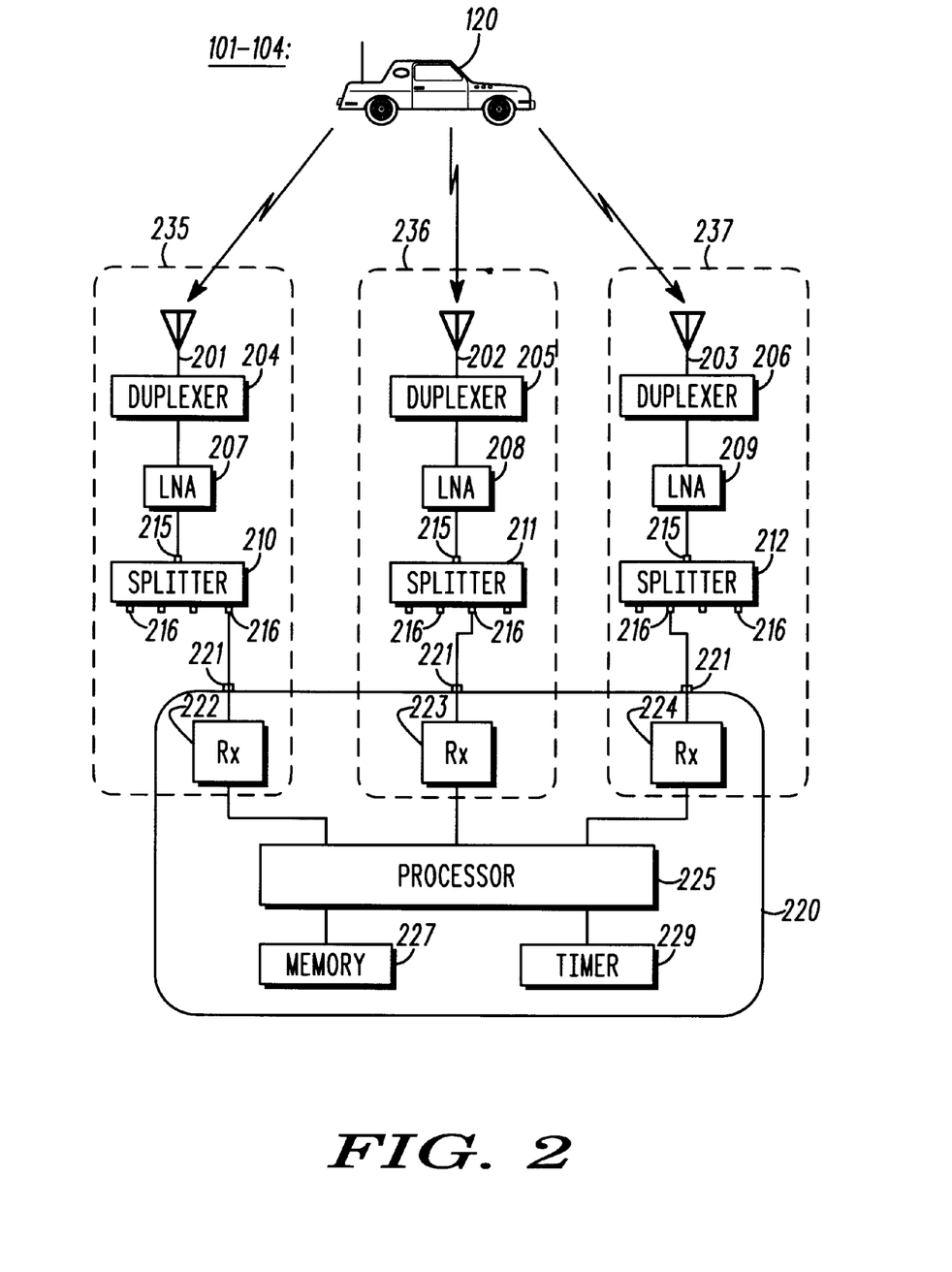
FIG. 2 is a block diagram of a base site in accordance with a preferred embodiment of the present invention.

Base sites 101–104 preferably comprise "iDEN" Enhanced Base Transceiver Sites (EBTS's) that are commercially available from Motorola, Inc. of Schaumburg, Ill. Each base site 101–104 provides communication service to a respective service coverage area 111–114. As shown in FIG. 2, each of the base sites 101–104 preferably comprises multiple antennas 201–203, multiple duplexers 204–206, multiple low noise amplifiers (LNA's) 207–209, multiple signal splitters 210–212, and at least one receiver section 220, preferably a base station.

Preferably, each of the signal splitters 210–212 is a four-way signal splitter. That is, each of the signal splitters 210–212 comprises one input port 215 and four output ports 216. Each signal splitter 210–212 receives an RF signal via the signal splitter's input port 215, splits the signal into four equal amplitude signals, and outputs each of the four equal amplitude signals at one of the signal splitter's four output ports 216.

Base station 220 preferably comprises multiple input ports 221, multiple receivers 222–224, a processor 225, a memory 227, and a timer 229. Preferably, each receiver of the multiple receivers 222–224, memory 227, and timer 229 are coupled to processor 225. Processor 225 preferably comprises a digital signal processor (DSP); however, in the alternative processor 225 might comprise a microprocessor or a microcontroller. Memory 227 preferably comprises a dynamic random access memory (DRAM) comprising multiple buffers. Timer 229 preferably comprises a connection to a system timer in the system controller 110; however, those of ordinary skill in the art realize that various timers might be used here, such as a 555 timer, without departing from the spirit and scope of the present invention. In an alternate embodiment of the present invention, processor 225 might comprise memory 227, timer 229, or both memory 227 and timer 229.

In the preferred embodiment of the present invention as shown in FIG. 2, the inbound portion of each base site 101–104 comprises three receive branches 235–237; however, the present invention only requires that there be multiple receive branches. Each receive branch 235–237 comprises the components through which an RF signal, or the RF signal's derivatives, propagates as the signal travels from an antenna 201–203 to processor 225. Preferably, each receive branch 235–237 (e.g., receive branch 235) comprises an antenna 201–203 (e.g. antenna 201), a duplexer 204–206 (e.g., duplexer 204) coupled to the antenna, an LNA 207–209 (e.g., LNA 207) coupled to the duplexer, a signal splitter 210–212 (e.g., signal splitter 210) coupled to the LNA, and a receiver 222–224 (e.g., receiver 222) coupled to the signal splitter via a base station input port 221. In the preferred embodiment, the components of each base site 101–104 that are external to the base station 220 are coupled to one another by use of coaxial cables.

In the preferred embodiment, the operation of a base site 101–104 is as follows. A low power RF signal transmitted by a system user 120, such as a mobile or portable communication unit, is received by all three antennas 201–203 (e.g., antenna 201). The RF signal might be part of an active communication in which the communication unit 120 is engaged, i.e., the present invention does not require the RF signal to be a test signal or a signal controlled by the system operator. The received RF signal is then processed by each receive branch 235–237. For clarity, the operation of receive branch 235 is described below. However, the procedures described for the processing of a received RF signal by branch 235 also apply to the processing of a received RF signal by branches 236 and 237. Antenna 201 of receive branch 235 conveys the received RF signal to duplexer 204. Duplexer 204 filters out a desired signal from undesired signals and conveys the desired signal to LNA 207. LNA 207 amplifies the desired signal and conveys the amplified signal to signal splitter 210. Signal splitter 210 receives the amplified signal from LNA 207 and outputs a split portion of the amplified signal to base station 220 via one of the signal splitter's four output ports 216.

In the preferred embodiment, one of the four output ports 216 of each signal splitter 210–212 is coupled to an input port 221 of base station 220. Each of the multiple receivers 222–224 of base station 220 is also coupled to an input port 221. In receive branch 235, base station 220 receives the amplified and split RF signal from signal splitter 210 and conveys the amplified and split RF signal to receiver 222. Receiver 222 downconverts, filters, and demodulates the received signal and conveys the demodulated signal to processor 225. Processor 225 then determines, as described below, at least one signal metric for the demodulated signal. Again, although the processing of a received RF signal has been described with respect to receive branch 235, the same procedures apply to the processing of a received RF signal by receive branches 236 and 237.

In the preferred embodiment, the demodulated signal is comprised of multiple portions. Processor 225 determines a signal metric for each of the three receive branches 235–237 with respect to each portion of the RF signal that is transmitted by the communication unit 120 and is received by all three branches 235–237. For example, Motorola's "iDEN" system uses a time division multiple access (TDMA) multiplexing scheme and a 16-ary quadrature amplitude modulation (16QAM) scheme. In a TDMA system, the RF signal carrying the information is segmented into intervals called time frames. Each frame is further partitioned into blocks of time called time slots. In a 16QAM modulation scheme, groups of data bits are each represented by one of 16 symbols in a constellation, each symbol being representative of four data bits and comprising a sine and cosine wave pair that is amplitude and phase modulated. Each time slot comprises multiple symbol positions and each symbol position comprises a symbol from the constellation or a pilot symbol or a synchronization symbol, which pilot and synchronization symbols may or may not be one of the symbols in the constellation. In the preferred embodiment, each signal portion comprises a time slot and, in processing the demodulated signal, processor 225 determines a signal metric for each of the three receive branches 235–237 with respect to each time slot, resulting in three signal metric determinations for each time slot. The signal metric comprises a signal power metric, preferably a received signal strength indication (RSSI) based on symbol power; however, in an alternate embodiment, the signal metric might comprise a signal quality metric, such as a carrier-to-interference plus noise ratio (C/I+N) or a bit error rate (BER).

Processor 225 compares the RSSI determinations for the three receive branches 235–237 with respect to a time slot, and selects a receive branch 235–237 yielding the highest RSSI value for the time slot. For example, suppose the RSSI value for receive branch 235 is –80 dBm, for receive branch 236 is –83 dBm, and for receive branch 237 is –96 dBm. Receive branch 235 would be selected as yielding the highest RSSI value for the time slot. Processor 225 then determines a difference between the RSSI value for the selected branch (i.e., receive branch 235) and the RSSI value for each of the other two branches (i.e., receive branches 236 and 237) to produce multiple signal metric comparisons. This is performed by comparing RSSI values for the time slot as received by branches 235 and 236, which comparison yields a 3 dB differential, and by comparing RSSI values for the time slot as received by branches 235 and 237, which comparison yields a 16 dB differential. Processor 225 then compares each signal metric comparison (i.e., 3 dB and 16 dB) to an imbalance threshold, preferably about 15 dB, to produce multiple performance comparisons, and determines that an imbalance condition exists when a signal metric comparison exceeds the imbalance threshold. In the above example, the signal metric comparison for branches 235 and 237, 16 dB, exceeds the imbalance threshold of 15 dB. The imbalance threshold is preferably small enough to allow for the detection of severe errors but large enough to prevent false failures, i.e., to prevent the determination of an imbalance condition when all three receive branches are properly configured, connected, and operational. In the event of an imbalance condition, the processor increments a counter, preferably a buffer located in memory 227.

In the preferred embodiment, each receive branch 235–237 has a corresponding counter located in memory 227; however, in the alternative, a single counter might be used to cumulatively count the number of imbalance conditions for all three branches 235–237. In the event of an imbalance condition between two branches (e.g., the 16 dB difference in RSSI values between receive branches 235 and 237), the counter for a receive branch with the lower RSSI value (i.e., receive branch 237) is incremented. Also, in the preferred embodiment, the RSSI value for the selected branch (i.e., branch 235) is compared to and must be greater than a floor threshold, preferably about –92 dBm, in order for the performance comparison to constitute an imbalance condition. Alternatively, instead of comparing the RSSI value for the selected branch to the floor threshold, the average RSSI value for all three receive branches is compared to the floor threshold in order for the performance comparison to constitute an imbalance condition. The value of the floor threshold is selected to assure that signal power, and not merely noise, is being measured. Those of ordinary skill in the art will appreciate that values other than 15 dB and –92 dBm may be used for the imbalance threshold and the floor threshold, respectively, without departing from the spirit and scope of the present invention.

Processor 225 repeats the above procedures with respect to each time slot derived by all three branches 235–237 from the received RF signal and from subsequently received RF signals. The values stored in the counters corresponding to each of the three receive branches 235–237 are monitored by processor 225 and compared to a maximum violations threshold. When a value stored in a counter exceeds the maximum violations threshold, processor 225 generates an error signal, preferably an alarm signal comprising a digital code. The presence of the alarm signal can be monitored remotely via a telephone interconnect that is a part of each base site 101–104 or over network 112. Preferably, the maximum violations threshold is about 960,000, i.e., 960, 000 time slots with respect to each of which the highest RSSI value for the three receive branches 235–237 is both greater than –92 dBm and is at least 15 dB greater than the RSSI value for the receive branch 235–237 corresponding to the particular counter. The value of the maximum violations threshold is selected to minimize the possibility of an alarm being sent due to a temporary and non-recurring problem; those of ordinary skill in the art will appreciate that a value other than 960,000 may be used for the maximum violations threshold without departing from the spirit and scope of the present invention.

In a first alternate embodiment of the present invention, instead of determining an imbalance condition the processor 225 determines a balanced condition when the imbalance threshold exceeds the signal metric comparison. The number of signal metric comparisons and the number of balanced conditions are stored, preferably by incrementing buffers in memory 227. Processor 225 then determines at least one difference between the number of signal metric comparisons and the number of balanced conditions by reference to memory 227, preferably determining a difference every time the number of signal metric comparisons buffer is incremented, or alternatively determining a difference at periodic intervals in order to reduce the number of processor 225 operations. Each determined difference is compared to the maximum violations threshold, and when the determined difference exceeds the maximum violations threshold processor 225 generates the error signal.

In a second alternate embodiment of the present invention, processor 225 also monitors the passage of time by reference to timer 229, and after the expiration of a predetermined time period processor 225 resets each of the counters 0. Preferably, the predetermined time period is a dynamic value that is based on the number of time slots in each time frame that are occupied by symbols. For example, if there are six time slots per time frame, each time frame is 90 ms in duration, and all six time slots in each time frame are occupied by symbols, then the minimum predetermined time period is approximately 4 hours. However, if only one time slot in each time frame is occupied by symbols, then the minimum predetermined time period is approximately 24 hours. In a third alternate embodiment of the present invention, a total number of time slots counter, preferably another buffer in memory 227, is incremented by processor 225 each time processor 225 processes a time slot occupied by symbols. In the third alternate embodiment, processor 225 may reset each of the receive branch counters when the total number of time slots counter attains a predetermined value, preferably a value greater than 960,000.

In general, the present invention provides improved detection of failures in the inbound portion of a wireless communication device, such as a base site 101–104, without requiring an investment in additional wireless communication equipment by taking an RF signal received by each branch of multiple receive branches 235–237 and comparing derivatives of the RF signal as received by the processor 225 via each branch. The present invention determines a signal metric for the RF signal derivative received via each branch, compares the signal metrics, determines whether any of the comparisons yield a difference greater than an imbalance threshold (i.e., an imbalance condition), and counts the number of imbalance conditions for each branch 235–237.

An imbalance condition can result from a poorly received signal due to improper connections in one receive branch (e.g. branch 235) or failed active devices in that branch, or short-circuit conditions that have arisen in that branch, or a host of other problems that would prevent a signal received at the antenna of that branch (e.g., antenna 201) from reaching processor 225. When the number of imbalance conditions for the branch exceeds a maximum violations threshold, an alarm signal is generated. By requiring a number of imbalance conditions before generating an alarm, the likelihood of false failures is minimized. The alarm signal can be remotely monitored, for example via telephone lines that connect to a telephone interconnect in a base site or via a network 112 that links multiple base sites 101–104 as part of a radio communication system 100, and corrective action can promptly be undertaken.

Figure 3:
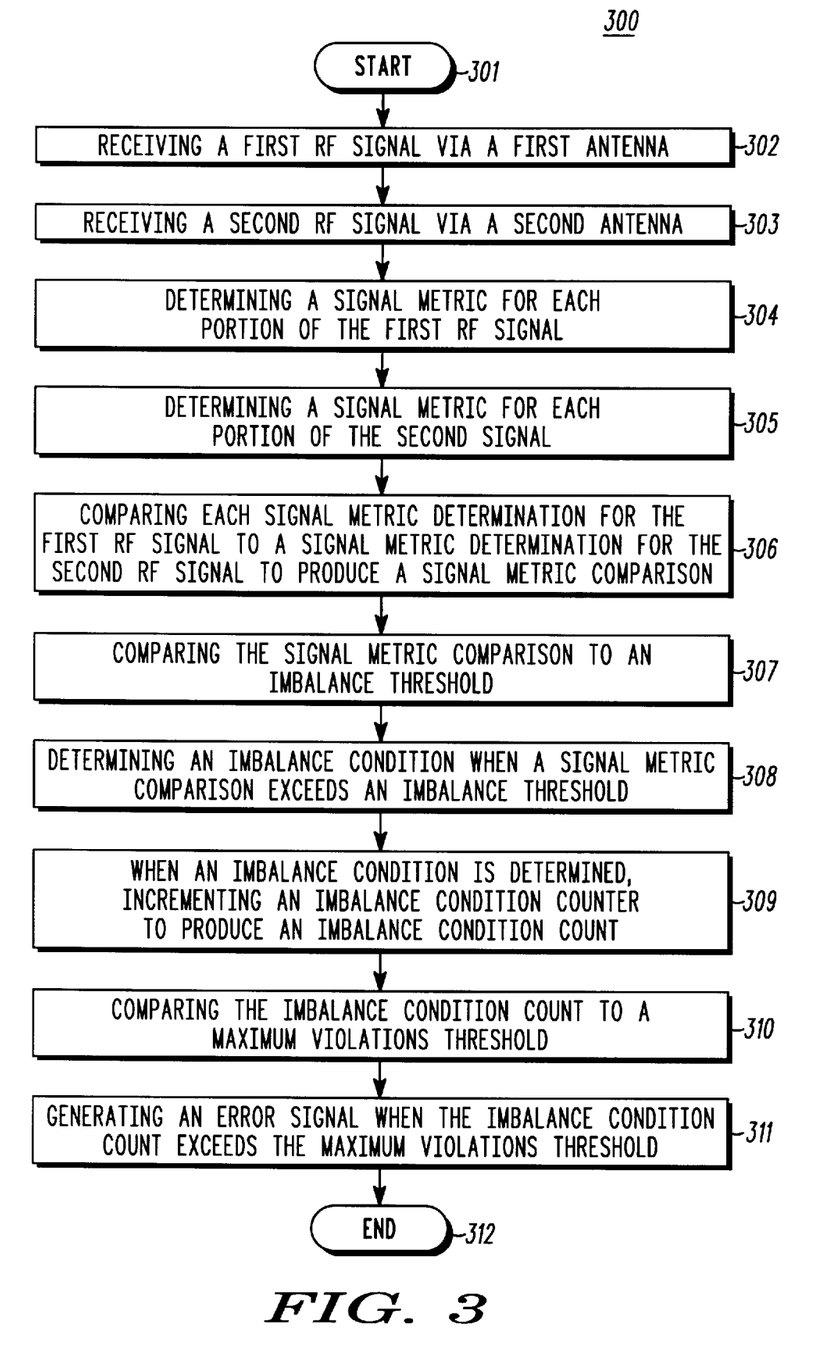
FIG. 3 is a logic flow diagram of steps executed by a communication device to detect a communication device failure in accordance with a preferred embodiment of the present invention.

FIG. 3 is a logic flow diagram of the steps executed by a communication device that comprises multiple antennas, a receiver, a processor, and a memory, to detect communication device failures in accordance with a preferred embodiment of the present invention. The logic flow begins (301) when the communication device receives (302) a first RF signal via a first antenna of the multiple antennas and receives (303) a second RF signal via a second antenna of the multiple antennas. In the preferred embodiment, the first and second RF signals are each segmented into multiple portions. Preferably, the first and second RF signals are each TDMA signals and each portion comprises a time slot. The first and second RF signals are modulated pursuant to a 16QAM modulation scheme, wherein groups of data bits are each represented by one of 16 symbols in a constellation, each symbol being representative of four data bits and comprising a sine and cosine wave pair that is amplitude and phase modulated. Each time slot comprises multiple symbol positions and each symbol position comprises a symbol from the constellation or a pilot symbol or a synchronization symbol, which pilot and synchronization symbols may or may not be one of the symbols in the constellation.

The communication device determines (304) a signal metric for each portion (e.g., time slot) of the first RF signal and determines (305) a signal metric for each portion (e.g. time slot) of the second RF signal, and compares (306) each signal metric determination for the first RF signal to a signal metric determination for the second RF signal to produce multiple signal metric comparisons. In the preferred embodiment, the signal metric comprises a signal power, preferably a received signal strength indication (RSSI) based on symbol power. The communication device compares (307) each of the multiple signal metric comparisons to an imbalance threshold, preferably about 15 dB, to produce multiple performance comparisons and determines (308) an imbalance condition in each instance that a signal metric comparison exceeds the imbalance threshold. When an imbalance condition is determined, the communication device increments (309) an imbalance condition counter, preferably by incrementing a number stored in a buffer in a memory, to produce an imbalance condition count. The communication device compares (310) the imbalance condition count to a maximum violations threshold. When the imbalance condition count exceeds the maximum violations threshold, the communication device generates (311) an error signal, preferably an alarm signal comprising a digital code. The maximum violations threshold is preferably 960,000. The step of generating an error signal can alternately comprise generating an error signal when the imbalance condition count exceeds a maximum violations threshold within a predetermined time period. Preferably, the predetermined time period is a dynamic value that is based on the number of time slots in each time frame that are occupied by symbols. For example, if there are six time slots per time frame, each time frame is 90 ms in duration, and all six time slots in each time frame are occupied by symbols, then the minimum predetermined time period is approximately 4 hours. However, if only one time slot in each time frame is occupied by symbols, then the minimum predetermined time period is approximately 24 hours. The logic flow then ends (312).

The error signal may be remotely monitored by connecting to the communication device via a telephone interconnect or over a network, or via a wireless transmission of the alarm signal. Those who are of ordinary skill in the art will realize that there are numerous other ways of remotely monitoring a communication device without departing from the spirit and scope of the present invention.

Figure 4:
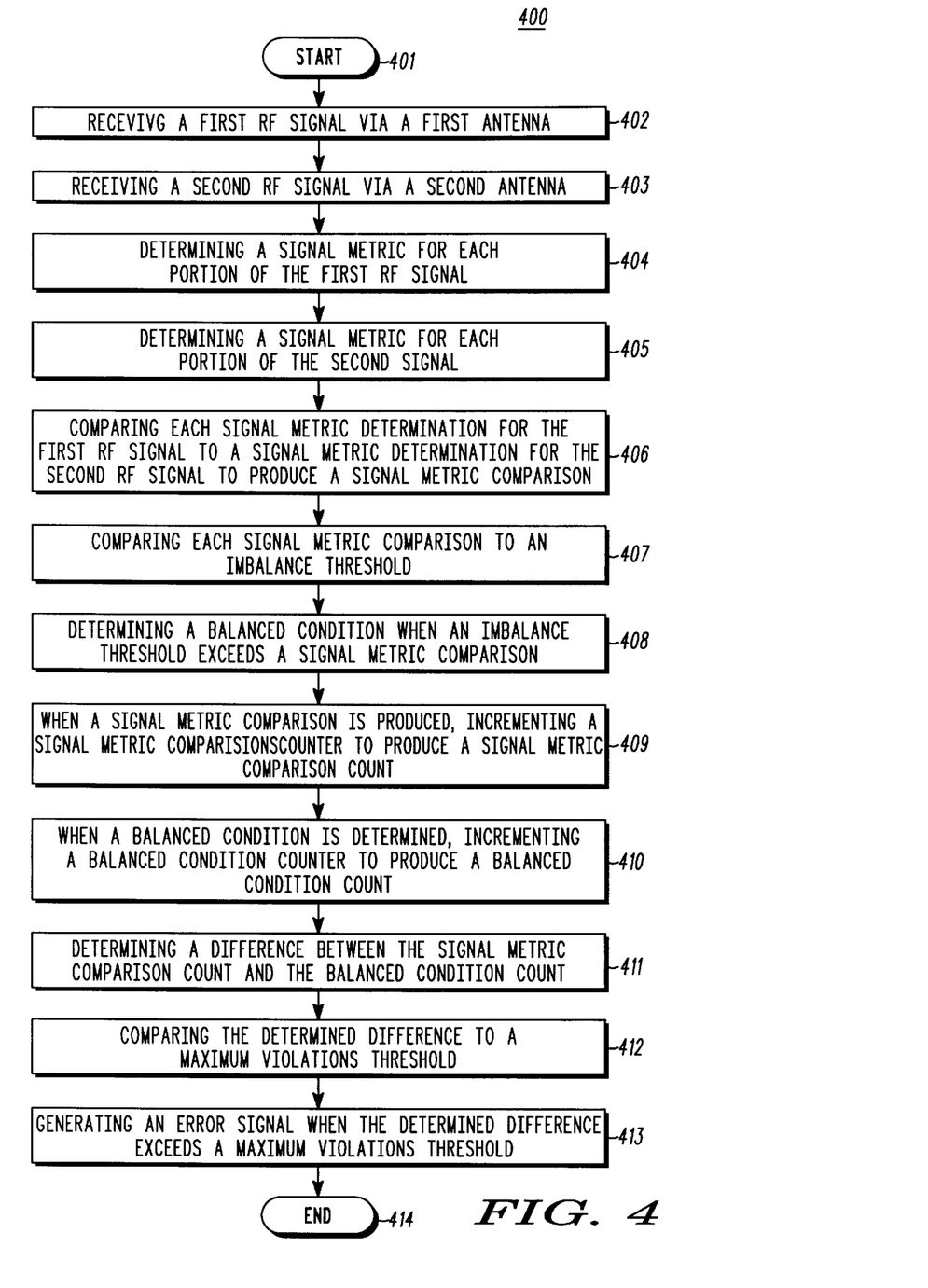
FIG. 4 is a logic flow diagram of steps executed by a communication device to detect a communication device failure in accordance with an alternate embodiment of the present invention.

FIG. 4 is a logic flow diagram of the steps executed by a communication device in accordance with an alternate embodiment of the present invention. In the alternate embodiment as described in FIG. 4, steps (401) through (407) are identical to steps (301) through (307) as described in FIG. 3. However, in the alternate embodiment as described in FIG. 4, after the communication device compares ((307), (407)) each of the multiple signal metric comparisons to the imbalance threshold, the communication device determines (408) a balanced condition when the imbalance threshold exceeds a signal metric comparison. When a signal metric comparison is produced, the communication device increments (409) a signal metric comparison counter, preferably a buffer in the memory, to produce a signal metric comparison count. When a balanced condition is determined, the communication device increments (410) a balanced condition counter, preferably in a second buffer in the memory, to produce a balanced condition count. The communication device determines (411) a difference between the signal metric comparison count and the balanced condition count, and compares (412) the determined difference to the maximum violations threshold. When the determined difference exceeds the maximum violations threshold, the communication device generates (413) an error signal. The step of generating an error signal can alternately comprise generating an error signal when the determined difference exceeds the maximum violations threshold within a predetermined time period. The logic flow then ends (414).

In general, the present invention as described in FIGS. 3 and 4 provides a method for detecting failures in the inbound portion of a communication device. The failures result in a signal, received by each of multiple antennas in the communication device, being determinedly different as received by the processor via one antenna as compared to the signal as received by the processor via another antenna. The method takes an RF signal that is received by each antenna of the multiple antennas, determines a signal metric for the signal as received by each antenna, and compares the signal metrics. An imbalance condition is determined when a comparison yields a signal metric differential that is greater than an imbalance threshold, and an alarm signal is generated based on a determination of at least one imbalance condition.

Generally, the present invention allows for the remote and prompt detection of improper connections, active device failures, and short circuits in a communication device or system. By detecting differences in signals received via multiple different receive branches of a communication device, multiple undesirable conditions in each branch affecting those signals can be detected and the source branch can be identified. By generating an alarm signal, those undesirable conditions can be remotely detected and promptly responded to. The ability to remotely and promptly detect a problem and to identify the general location of the problem is a highly desirable feature for a wireless infrastructure system comprising geographically diverse base sites and for which system availability is critical.

While the present invention has been particularly shown and described with reference to particular embodiments thereof, it will be understood by those skilled in the art that various changes in form and details may be made therein without departing from the spirit and scope of the present invention.

We claim:

1. A communication device comprising:
   a receiver section comprising a plurality of radio frequency (RF) input ports, a receiver, and a processor for determining a signal metric of an RF signal available on each input port of the plurality of RF input ports;
   an antenna system coupled to the plurality of RF input ports for coupling thereto the received RF signal, the antenna system comprising a plurality of antennas, wherein the plurality of antennas comprises:
      a first antenna for coupling a first RF signal to a first input port of the plurality of input ports;
      a second antenna for coupling a second RF signal to a second input port of the plurality of input ports; and
   wherein the processor determines a signal metric of each portion of a plurality of portions of the first RF signal, determines a signal metric of each portion of a plurality of portions of the second RF signal, compares each signal metric determination of the first RF signal with a signal metric determination of the second RF signal to produce a plurality of signal metric comparisons, compares each signal metric comparison of the plurality of signal metric comparisons to an imbalance threshold to produce a plurality of performance comparisons, and generates an error signal based on the plurality of performance comparisons.

2. The communication device of claim 1, wherein the first radio frequency (RF) signal and the second RF signal are the same RF signal as separately received by the first antenna and by the second antenna.

3. The communication device of claim 1, wherein the receiver comprises a first receiver and a second receiver, wherein the first receiver is coupled to the first RF input port and to the processor, wherein the second receiver is coupled to the second RF input port and to the processor, wherein the first RF signal is coupled to the processor via the first antenna, the first RF input port, and the first receiver, and wherein the second RF signal is coupled to the processor via the second antenna, the second RF input port, and the second receiver.

4. The communication device of claim 1, wherein the communication device further comprises a memory, wherein the memory comprises a counter, wherein the processor determines an imbalance condition when a signal metric comparison of the plurality of signal metric comparisons exceeds the imbalance threshold, wherein the processor increments a number in the counter when an imbalance condition is determined, and wherein the processor compares the number in the counter to a maximum violations threshold and generates an error signal when the number exceeds the maximum violations threshold.

5. The communication device of claim 1, wherein the communication device further comprises:
   a timer;
   a memory comprising a counter; and
   wherein the processor determines an imbalance condition when a signal metric comparison of the plurality of signal metric comparisons exceeds the imbalance threshold, wherein the processor increments a number in the counter when an imbalance condition is determined, and wherein processor compares the number in the counter to a maximum violations threshold and generates an error signal when the number exceeds the maximum violations threshold within a predetermined time period.

6. The communication device of claim 1, wherein the communication device further comprises a memory comprising a plurality of counters, wherein the processor determines a balanced condition when the imbalance threshold exceeds a signal metric comparison, wherein the processor increments a number in a first counter of the plurality of counters when the processor determines a signal metric comparison, wherein the processor increments a number in a second counter of the plurality of counters when the processor determines a balanced condition, wherein the processor determines a difference between the number in the first counter and the number in the second counter, and wherein the processor compares the determined difference to a maximum violations threshold and generates an error signal when the determined difference exceeds the maximum violations threshold.

7. The communication device of claim 1, further comprising:
   a timer;
   a memory comprising a plurality of counters; and
   wherein the processor determines a balanced condition when the imbalance threshold exceeds a signal metric comparison, wherein the processor increments a number in a first counter of the plurality of counters when the processor determines a signal metric comparison, wherein the processor increments a number in a second counter of the plurality of counters when the processor determines a balanced condition, wherein the processor determines a difference between the number in the first counter and the number in the second counter, and wherein the processor compares the determined difference to a maximum violations threshold and generates an error signal when the determined difference exceeds the maximum violations threshold within a predetermined time period.

8. A method for detecting failures in a communication device comprising a plurality of antennas, a receiver, and a processor, the method comprising:

receiving a first radio frequency (RF) signal via a first antenna of the plurality of antennas;

determining a signal metric for each portion of a plurality of portions of the first RF signal;

receiving a second RF signal via a second antenna of the plurality of antennas;

determining a signal metric for each portion of a plurality of portions of the second RF signal;

comparing each signal metric detemination for the first RF signal to a signal metric determination for the second RF signal to produce a plurality of signal metric comparisons;

comparing the signal metric comparison of the plurality of signal metric comparisons to an imbalance threshold to produce a plurality of performance comparisons; and generating an error signal based on the plurality of performance comparisons.

9. The method of claim 8, wherein the first radio frequency (RF) signal and the second RF signal are the same RF signal as separately received by the first antenna and by the second antenna.

10. The method of claim 8, wherein the step of generating an error signal comprises the steps of:

determining an imbalance condition when a signal metric comparison of the plurality of signal metric comparisons exceeds the imbalance threshold;

incrementing, when an imbalance condition is determined, an imbalance condition counter to produce an imbalance condition count;

comparing the imbalance condition count to a maximum violations threshold; and wherein the step of generating an error signal comprises generating an error signal when the imbalance condition count exceeds the maximum violations threshold.

11. The communication device of claim 8, wherein the step of generating an error signal comprises the steps of:

determining an imbalance condition when a signal metric comparison exceeds the imbalance threshold;

incrementing, when an imbalance condition is determined, an imbalance condition counter to produce an imbalance condition count;

comparing the imbalance condition count to a maximum violations threshold; and wherein the step of generating an error signal comprises generating an error signal when the imbalance condition count exceeds the maximum violations threshold within a predetermined time period.

12. The method of claim 8, wherein the step of generating an error signal comprises the steps of:

incrementing, when a signal metric comparison is produced, a signal metric comparison counter to produce a signal metric comparison count;

determining a balanced condition when the imbalance threshold exceeds a signal metric comparison;

incrementing, when a balanced condition is determined, a balanced condition counter to produce a balanced condition count;

determining a difference between the signal metric comparison count and the balanced condition count;

comparing the determined difference to a maximum violations threshold; and wherein the step of generating an error signal comprises generating an error signal when the determined difference exceeds the maximum violations threshold.

13. The method of claim 8, wherein the step of generating an error signal comprises the steps of:

incrementing, when a signal metric comparison is produced, a signal metric comparison counter to produce a signal metric comparison count;

determining a balanced condition when the imbalance threshold exceeds a signal metric comparison;

when a balanced condition is determined, incrementing a balanced condition counter to produce a balanced condition count;

determining a difference between the signal metric comparison count and the balanced condition count;

comparing the determined difference to a maximum violations threshold; and wherein the step of generating an error signal comprises generating an error signal when the determined difference exceeds a maximum violations threshold within a predetermined time period.

* * * * *

UNITED STATES PATENT AND TRADEMARK OFFICE
CERTIFICATE OF CORRECTION

PATENT NO. : 6,332,072 B1
DATED : December 18, 2001
INVENTOR(S) : Johnson et al.

It is certified that error appears in the above-identified patent and that said Letters Patent is hereby corrected as shown below:

<u>Title page,</u>
Item [54] Title: after DEVICE, delete "BV SIGNAL METRICS"

Signed and Sealed this

Fourteenth Day of May, 2002

*Attest:*

JAMES E. ROGAN
*Attesting Officer*     *Director of the United States Patent and Trademark Office*